United States Patent [19]

Shiga et al.

[11]  4,259,461

[45]  Mar. 31, 1981

[54] PROCESS FOR PRODUCING PROPYLENE-ETHYLENE BLOCK COPOLYMERS

[75] Inventors: Akinobu Shiga; Masahiro Kakugo; Yoshiharu Fukui; Koji Yamada; Hajime Sadatoshi; Kazuki Wakamatsu; Hiroshi Yoshioka, all of Niihama, Japan

[73] Assignee: Sumitomo Chemical Company, Limited, Osaka, Japan

[21] Appl. No.: 41,462

[22] Filed: May 22, 1979

[30] Foreign Application Priority Data

May 22, 1978 [JP] Japan .................................. 53-61467
Jun. 29, 1978 [JP] Japan .................................. 53-79383

[51] Int. Cl.$^3$ ......................................... C08F 297/08
[52] U.S. Cl. ......................................... 525/247
[58] Field of Search ........................................ 525/247

[56] References Cited

U.S. PATENT DOCUMENTS

| | | | |
|---|---|---|---|
| 3,732,335 | 5/1973 | Hermans et al. | 525/247 |
| 3,911,052 | 10/1975 | Castagna et al. | 525/523 |
| 3,917,746 | 11/1975 | Aishima et al. | 525/247 |
| 3,954,704 | 5/1976 | Verne et al. | 525/247 |

FOREIGN PATENT DOCUMENTS

| | | |
|---|---|---|
| 744424 | 10/1966 | Canada . |
| 871193 | 5/1971 | Canada . |
| 41-597 | 1/1966 | Japan . |
| 46-1046 | 9/1971 | Japan . |
| 47-26113 | 7/1972 | Japan . |
| 51-16298 | 2/1976 | Japan . |
| 51-145589 | 12/1976 | Japan . |
| 52-3684 | 1/1977 | Japan . |
| 1391067 | 4/1975 | United Kingdom . |
| 1532231 | 11/1978 | United Kingdom . |

*Primary Examiner*—Harry Wong, Jr.
*Attorney, Agent, or Firm*—Sughrue, Rothwell, Mion, Zinn and Macpeak

[57] ABSTRACT

An improved process for producing propylene-ethylene block copolymer is disclosed utilizing a catalyst system comprising (A) a titanium trichloride solid catalyst obtained by reducing titanium tetrachloride with an organoaluminum compound and activating, (B) an organoaluminum compound, and optionally, (C) an electron donor.

11 Claims, No Drawings

PROCESS FOR PRODUCING PROPYLENE-ETHYLENE BLOCK COPOLYMERS

BACKGROUND OF THE INVENTION

1. Field of the Invention

The present invention relates to a process for producing propylene-ethylene block copolymers. More specifically, the present invention relates to a process for producing propylene-ethylene copolymers having improved properties by using highly active composite catalyst systems.

2. Description of the Prior Art

Since the invention of stereoregular catalysts by Ziegler and Natta, crystalline polyolefins have been produced on an industrial scale. Crystalline polypropylene has attracted special attention as a general-purpose resin having excellent stiffness and heat resistance. However, because crystalline polypropylene is brittle at low temperatures it is not suitable in uses which require low temperature impact resistance. In order to overcome this disadvantage, extensive studies have been directed to improved processes for preparing the polyolefin. Among them, processes for block copolymerizing propylene with other olefins, especially ethylene, are known. Japanese Patent Publication Nos. 13049/68 and 26113/72, Japanese Patent Application (OPI) Nos. 120986/74, 135987/76 and 3684/77 propose block copolymerization processes comprising, in the first stage, polymerizing propylene alone in the liquefied propylene in the absence of an inert solvent and, successively in the second stage, randomly copolymerizing ethylene and propylene in liquefied monomer or in monomer gas or polymerizing ethylene alone in monomer gas.

When conventional catalyst systems consisting essentially of titanium trichloride solid catalyst (such as titanium trichloride obtained by reducing titanium tetrachloride with metallic aluminum or hydrogen or co-crystallization products of titanium trichloride and aluminum trichloride, and an organoaluminum compound) are used in the propylene-ethylene block copolymerization, a large amount of catalyst residue remains in the polymer particle product because the amount of polymer produced per gram of titanium trichloride solid catalyst is small. As a result when the polymer product is molded into an article it yellows thus deteriorating its commercial value.

In addition, as polymer particles are usually melt mixed and pelletized and further molded by melting in various molding machines. Very often these polymers are remarkably degraded during such melting step and suffer a loss in mechanical properties. Further, degradation by ultraviolet light is so marked that the use of moldings for an extended time is difficult. Accordingly, in such processes, it is necessary to post treat the polymer such as by extraction of the catalyst residues, etc. as is necessary in the polymerization in an inert solvent, thus complicating the production.

Furthermore, because the solubility of low molecular weight and low crystalline polymer by-products is higher in the inert solvents commonly employed in some polymerizations than in the liquefied monomer, when the propylene-ethylene block copolymerization is conducted in the absence of the inert solvent, the proportion of the low molecular weight and low crystalline polymer contained in the polymer particles is remarkably higher as compared with the case of the polymerization in the inert solvent. As a result, if a conventional catalyst is employed, the characteristics of the propylene polymers, i.e., stiffness and heat resistance, suffer and it is difficult to use moldings in fields where such physical properties are required. The low molecular weight and low crystalline polymer by-product forms on the polymer particle surfaces in great amounts and the cohesion between the particles increases and problems such as agglomeration of the polymer, reduction in heat transfer efficiency due to the deposit of the polymer on the inner walls of a polymerization vessel and even frequent occurance of blocking of pipes, powder hoppers and silos during transportation of the polymer slurry or polymer powder occur.

In conducting the polymerization in the gas phase, as proposed in Japanese Patent Publication Nos. 597/66 and 13962/72, Japanese Patent Application (OPI) No. 145589/76 etc. a fluidized-bed reactor fluidized with the monomer gas or an agitating fluidized-bed reactor is useful to remove the polymerization heat and prevent the polymer particles from agglomerating or melting. In the case of the polymer particles having great cohesion, extremely large amounts of fluidizing gas flow or stirring force are needed to fluidize the polymer particles. If the cohesion is still too great, it is not possible to keep uniform fluidized conditions, leading to the difficulty in uniform heat removal and to agglomeration or melting of the polymer. Thus production is jeopardized.

Further, if a large amount of the low molecular weight and low crystalline polymer is contained in the polymer particles, the stiffness and heat resistance which are characteristic of polypropylene deteriorate remarkably. Therefore, it is necessary to use catalyst systems which reduce the production of such low molecular weight and low crystalline polymer if the production of some low molecular weight and low crystalline by-product cannot be avoided and prevent the increase in cohesion between the particles when propylene and ethylene are block copolymerized in the substantial absence of an inert solvent in the liquefied monomer or in the gas phase.

Moreover, as mentioned above, in the case of the polymerization in the gas phase, although it is effective to circulate the monomer gas, if the particle size distribution of produced polymer particles is broad and fine particles are present in fairly large amounts, flying of fine particles occurs and much effort and uneconomical equipment are required to separate or remove these fine particles, otherwise they could block a heat exchange or circulating compressor. Therefore, the particle size distribution of the polymer particle product is desirably as narrow as possible. Thus, in conducting the process of the present invention for producing propylene-ethylene block copolymers, it is essential to use catalyst systems which reduce the production of such low molecular weight and low crystalline polymer and, if more or less produced, provide polymer particles having less cohesion and narrower particle size distribution.

However, if the polymerization similar to that of the present invention is conducted in the absence of an inert solvent using the catalyst systems disclosed in the prior art mentioned hereinbefore, the various problems mentioned above occur because the polymer particles contain the low molecular weight and low crystalline polymer. Similarly, in Japanese Patent Publication No. 20501/64, Japanese Patent Application (OPI) No. 1046/71 etc., there are proposed processes for producing titanium trichloride compositions which contain only small amounts of fine particles and give polymers in a narrow particle size distribution by reducing titanium tetrachloride with an organoaluminum compound and further treating the catalyst with heat. Even when such catalysts are used to produce propylene-ethylene block copolymers as in the present invention, the produced polymers, although having a narrow particle size distribution, contain large amounts of the low molecular weight and low crystalline polymer by-product which remarkably increases cohesion between the polymer particles. In addition, the catalyst's polymerization activity and stereo-regularity are unsatisfactory. Thus, it has actually been very difficult to produce propylene-ethylene block copolymers under stable conditions.

As a result of extensive research directed to overcoming the aforementioned problems, a process for stably and economically producing propylene-ethylene block copolymers having improved properties without the above problems has been found.

SUMMARY OF THE INVENTION

Accordingly one object of the present invention is to provide a process for producing propylene-ethylene block copolymers having improved physical properties using a specified catalyst system.

Still another object of the present invention is to produce a polymer in a narrow particle size distribution.

Another object of the present invention is to provide a process for producing propylene-ethylene block copolymers without leaving large amounts of catalyst residue in the polymer to thereby produce a polymer which is not as suspectible to discoloration and degradation.

Still another object of the present invention is to provide a process for producing propylene-ethylene block copolymers without producing large amounts of low molecular weight and low crystalline polymer by-product.

A further object of the present invention is to provide a process for producing propylene-ethylene block copolymers using a more efficient catalyst system which prevents cohesion and agglomeration among the polymer particle product.

Other objects and advantages of the present invention will be apparent from the following explanation.

The present invention is a process for block copolymerization of propylene and ethylene comprising, in the first stage, initiating polymerization of propylene alone or with a minor amount of ethylene in the substantial absence of an inert solvent and continuing the polymerization in the liquefied monomer or in the monomer gas, and subsequently in the second stage, randomly copolymerizing propylene and ethylene in the liquefied monomer or in the monomer gas or polymerizing ethylene alone in the monomer gas wherein the catalyst system comprises:

(A) a titanium trichloride solid catalyst obtained by reducing titanium tetrachloride with an organoaluminum compound and activating, and (B) an organoaluminum compound of the formula, $R_mAlY_{3-m}$, wherein R represents a straight chain or branched chain alkyl group having 1 to 8 carbon atoms, Y represents a halogen atom or a hydrogen atom or an alkoxy group having 1 to 8 carbon atoms and m is a number satisfying the relation $2 \leq m \leq 3$, and optionally (C) an electron donor, the polymerization amount per gram of titanium trichloride solid catalyst being at least 8,000 g block copolymer per gram titanium trichloride catalyst.

DETAILED DESCRIPTION OF THE INVENTION

Examples of the titanium trichloride solid catalysts used as catalyst component (A) are as follows:

(1) A titanium trichloride solid catalyst obtained by reacting products (i), (ii) or (iii) defined below with a mixture of a halogen or halogen compound and an ether:

(i) A reduced product obtained by reducing titanium tetrachloride with an organoaluminum compound of the formula $R'_nAlX'_{3-n}$, wherein R' represents a straight chain or branched chain alkyl group, an alicyclic group or an aryl group each having up to 18 carbon atoms, X' represents a halogen atom or a hydrogen atom and n is a number $1 \leq n \leq 3$.

(ii) A heat treated solid obtained by heat treating the reduced product (i) in the presence or absence of an inert hydrocarbon solvent at a temperature of about 50° to 120° C.

(iii) A reaction product obtained by further reacting the reduced product (i) with an aluminum compound of the formula $R''_pAlX_{3-p}$, wherein R'' represents a straight chain or branched chain alkyl group, an alicyclic group or an aryl group each having up to 18 carbon atoms, X represents a halogen atom and p is a number $1 \leq p < 1.5$, (2) A titanium trichloride solid catalyst obtained by reacting (i) or (ii) defined below with an ether and then reacting the thus obtained solid with titanium tetrachloride.

(i) A reduced product obtained by reducing titanium tetrachloride with an organoaluminum compound of the formula $R'_nAlX'_{3-n}$.

(ii) A heat treated solid obtained by heat treating the reduced product (i) in the presence or absence of an inert solvent at a temperature of 20° to 100° C.

(3) A titanium trichloride solid catalyst obtained by reacting the titanium trichloride solid catalyst (2) defined above with a mixture of a halogen or a halogen compound and an ether.

(4) A titanium trichloride solid catalyst obtained by reducing titanium tetrachloride with an organoaluminum compound of the formula, $R'_nAlX'_{3-n}$ reacting the reduced product thus obtained with an ether compound and then reacting the ether-treated solid with an aluminum compound of the formula $R''_pAlX_{3-p}$ and optionally further reacting the thus obtained solid with an ether or a mixture of a halogen or a halogen compound and an ether.

Of these catalysts, catalysts prepared as in (1) and (2) are preferred.

In the present invention, the titanium trichloride solid catalysts used as catalyst component (A) and exemplified in (1) to (4) above are proposed in e.g., U.S. Pat. No. 4,165,298, British Pat. No. 1,391,067, Japanese Patent Application (OPI) No. 16298/76 etc. and reference can be made to these publications for their preparations.

Examples of the organoaluminum compounds of the formula $R'_nAlX'_{3-n}$ include methylaluminum dichloride, ethylaluminum dichloride, n-propylaluminum dichloride, ethylaluminum sesquichloride, dimethylaluminum chloride, diethylaluminum chloride, di-n-propylaluminum chloride, trimethylaluminum, triethylaluminum, tri-isobutylaluminum, ethyldicyclohexylaluminum, triphenylaluminum, diethylaluminum hydride, di-isobutylaluminum hydride, diethylaluminum bromide, diethylaluminum iodide, etc. Among them diethylaluminum chloride and ethylaluminum sesquichloride are especially preferred.

In the reduction of titanium tetrachloride with the organoaluminum compound $R'_nAlX'_{3-n}$ in preparations (1) to (4) above, the molar ratio of the organoaluminum compound to titanium tetrachloride used is generally about 0.1 to 2, preferably about 0.3 to 1.5. The reduction is generally carried out at a temperature of about −70° C. to 60° C., preferably −20° C. to 30° C. and preferably, in the presence of an inert hydrocarbon solvent such as an aliphatic hydrocarbon, an alicyclic hydrocarbon or an aromatic hydrocarbon such as pentane, hexane, heptane, benzene, toluene, xylene, etc.

The ether compounds used in the preparation of catalysts (1)-(4) are of the formula $R_1$—O—$R_2$, wherein $R_1$ and and $R_2$ are a straight chain or branched chain alkyl group having 1 to 8 carbon atoms and they may be the same or different. Suitable examples are diethyl ether, di-n-propyl ether, di-isopropyl ether, di-n-butyl ether, di-isoamyl ether, di-neopentyl ether, di-n-hexyl ether, methyl-n-butyl ether, methyl-isoamyl ether, ethyl-isobutyl ether, etc. Among them di-n-butyl ether and di-isoamyl ether give especially preferable results.

The reaction with the ether compound is carried out at a temperature of about 0° C. to 130° C., preferably about 20° C. to 100° C. In this reaction, the molar ratio of the ether compound to titanium trichloride contained in the solid used ranges from about 0.1 to 3, preferably from about 0.5 to 1.5.

Examples of the aluminum compounds of the formula $R''_pAlX_{3-p}$, are methylaluminum dichloride, ethylaluminum dichloride, n-propylaluminum dichloride, n-butylaluminum dichloride, n-hexylaluminum dichloride, n-octylaluminum dichloride, phenylaluminum dichloride, o-tolylaluminum dichloride, cyclohexylaluminum dichloride, methylaluminum dibromide, ethylaluminum dibromide, phenylaluminum dibromide, methylaluminum diiodide etc. Among them ethylaluminum dichloride is especially preferred. The above aluminum compounds can be used either alone or as a mixed system of two or more compounds.

The reaction with the aluminum compound of the formula $R''_pAlX_{3-p}$, is carried out at a temperature of about 20° C. to 200° C., preferably about 50° C. to 120° C. In this reaction, the molar ratio of the aluminum compound to titanium trichloride contained in the solid used is preferably about 0.1 to 5.

The halogen or halogen compound which is used for reacting with the mixture of the halogen compound and the ether compound in the catalyst preparations (1), (3) and (4) above is at least one halogen compound selected from:

(a) $Cl_2$, $Br_2$ or $I_2$, (b) an inter-halogen compound of the formula XX'a, wherein X and X' are different and represent Cl, Br or I and a is 1 or 3, (c) a halogenated hydrocarbon compound of the formula $R_3$—X, wherein $R_3$ represents a straight chain or branched chain alkyl, alicyclic or aryl group having 3 to 18 carbon atoms, and (d) a halogenated methyl derivative of the formula $CH_qX_{4-q}$, wherein X represents a halogen and q is 0, 1, 2 or 3.

Examples of the inter-halogen compound (b) include bromine chloride, iodine chloride, iodine trichloride, iodine bromide etc.

Examples of the halogenated hydrocarbon compound (c) are compounds such as straight chain or branched alkyl halides, alicyclic halides, aromatic halides, aralkyl halides etc. Among them, the straight chain or branched alkyl halides give desired results. Still further, the straight chain or branched primary alkyl halides and the straight chain or branched secondary halides give especially preferable results. n-Butyl iodide is especially preferred.

Examples of the halogenated hydrocarbon compound (d) are carbon tetrachloride, chloroform, methylene chloride, carbon tetrabromide, bromoform, methylene bromide and mixtures thereof. Carbon tetrachloride is most preferred among them.

Particularly, among the above halogen compounds, iodine gives the most preferable results.

The reaction of the mixture of halogen or halogen compound and the ether compound is carried out at about 0° C. to 150° C., preferably about 40° C. to 100° C., and in this reaction, the molar ratios of ether compound and halogen or halogen compound to titanium trichloride contained in the solid used are about 0.001 to 5, preferably about 0.005 to 3.0 in the case of the ether and about 0.001 to 2.0, preferably about 0.005 to 1.0 in the case of the halogen or halogen compound.

The reaction with titanium tetrachloride in the preparation of catalyst (2) is carried out at about 0° C. to 100° C., preferably about 20° C. to 80° C. The molar ratio of titanium tetrachloride to titanium trichloride contained in the solid is about 0.2 to 15, preferably about 0.5 to 5. Preferably, the titanium tetrachloride is used as it is or an inert hydrocarbon solution having a titanium tetrachloride concentration of at least 10% by weight.

Each of the above reactions is generally carried out for about 5 minutes to 5 hours and is preferably carried out in the presence of an inert hydrocarbon solvent such as hexane, heptane, octane, benzene, toluene, xylene and the like. Preferably, the solid obtained in the each reaction is applied to the succeeding reaction or polymerization after isolation, that is, separation, washing and then drying. Inert hydrocarbon solvents useful as washing media include hexane, heptane, octane, benzene, toluene, xylene and the like.

Examples of the organoaluminum compounds used as catalyst component (B) in the present invention and of the formula $R_mAlY_{3-m}$ include dimethylaluminum chloride, diethylaluminum chloride, di-isobutylaluminum chloride, diethylaluminum bromide, diethylaluminum iodide, trimethylaluminum, triethylaluminum, diethylaluminum hydride, diethylaluminum ethoxide etc., with diethylaluminum chloride being most preferred.

When an electron donor is used as component (C) to improve a stereoregurality, known compounds such as amines, ethers, esters, derivatives of sulfur, halogens, benzene, azulene etc., organic or inorganic nitrogen and phosphorus compounds etc. can be used. The examples are triethylamine, tri-n-butylamine, diethyl ether, ethyl-vinyl ether, methyl acrylate, methyl methacrylate, ethyl benzoate, ethyl p-anisate, methyl n-butyrate, γ-butyrolactone, ε-caprolactone, di-n-butyl sulfide, thiophenol, benzoyl chloride, methyl p-methylbenzoate, tri-n-butyl phosphite, triphenyl phosphite, tri-n-butyl phosphine, triphenyl phosphine, tri-n-butyl phosphate, hexamethylphosphoric triamide etc.

The amounts of the catalyst components, i.e. (A) the activated titanium trichloride solid catalyst, (B) the organic aluminum compound and, (C) the stereoregularity improving agent are not particularly limited. A molar ratio of (C)/(A) of about 0.1 to 10, more preferably about 0.5 to 5 is suitably used and component (B) is preferably used at a concentration in a polymerization vessel of about 0.05 to 50 mmol, preferably 0.1 to 20 mmol, per mol of the monomer. The molar ratio of (B)/(A) is about 1 to 500, preferably about 1 to 100.

The order of addition of catalyst components to the polymerization reactor is not limited, but if component (A) and component (C) come into direct contact at high concentrations in the absence of component (B), reduction in activity sometimes occurs, and therefore if there is such fear the order of addition should be taken into consideration.

It has been found that in the production of propylene-ethylene block copolymers, the problems due to the catalyst residue contained in the polymer can be avoided even omitting the conventional catalyst removal (extraction) step by making the polymerization amount per gram of the titanium trichloride solid catalyst at least 8,000 g/g-titanium trichloride solid catalyst. It is almost impossible to obtain a polymerization amount per gram of the titanium trichloride solid catalyst greater than 8,000 g/g-titanium trichloride solid catalyst using the conventional catalyst systems used in the block copolymerization due to the poor catalyst activity. Even if such catalyst activity is available, reduction in catalyst activity with time occurs over a very extended time and, therefore, it is infeasible from a practical point of view.

The catalyst systems used in the present invention possess a remarkably improved effect with respect to catalyst activity as compared with the conventional catalyst systems used in the block copolymerization, and catalyst activity of at least 8,000 g/g-titanium trichloride solid catalyst can be attained in a very short time.

Where it is desired to remove any traces of the catalyst residues remaining in the polymer, a quite simple step for removing the catalyst residues can be added. For example, as is proposed in Japanese Patent Application (OPI) No. 21285/78, the above-mentioned traces of catalyst residue can be easily removed by contacting the polymer powder with an epoxide or a mixed gas of an epoxide with alcohol or water.

By conducting the production of propylene-ethylene block copolymers using the catalyst system used in the present invention, since the formation of the low molecular weight and low crystalline polymer is prevented, the cohesion between the polymer particles is small and problems such as the reduction in heat transfer efficiency due to the agglomeration of the polymer, the deposit of the polymer on the inner wall of the polymerization vessel during the polymerization, blocking of piping, powder hopper or silo during transportation of the polymer slurry or the polymer powder are eliminated. Propylene-ethylene block copolymers having excellently balanced properties of impact resistance and heat resistance are obtained.

Since the propylene-ethylene block copolymers obtained according to the present invention have a very narrow particle size distribution, when the process is conducted in the gas phase using a fluidized bed reactor or an agitating fluidized bed reactor, the loss of the fine particles is not a problem, thus a steady operation is possible. Since problems such as the agglomeration of the polymer in the polymerization zone, the increase in stirring force, the deposit of the polymer on the inner wall of the reactor etc. due to the cohesion of the powder are obviated; stirring, heat removal, fluidization, etc. in the polymerization vessel become quite simple. Another characteristic advantage inherent to the catalyst systems used in the present invention is its extremely high polymerization activity as compared with the conventional catalyst systems used in the block copolymerization.

The polymerization in the present invention is conducted in two stages in the presence of the above-mentioned catalyst system and in the substantial absence of an inert solvent. In some cases it may be desirable to disperse the catalyst in a small amount of inert solvent, however, the amount of solvent is negligible in comparison to the amount of monomer polymerized. In the first stage, polymerization of propylene alone or with a minor amount of ethylene in the liquefied propylene is initiated. The polymerization is continued in the liquefied propylene or in the gas phase so that the ethylene content in the polymer produced in the first stage is not more than about 4% by weight to produce crystalline polypropylene accounting for about 60 to 95% by weight of the final block copolymer. When propylene is polymerized alone in the first stage, polymers having well balanced impact resistance, heat resistance and stiffness are obtained by subsequently conducting the second stage polymerization. If improvements in surface gloss, impact strength and impact blushing are desired to some extent at the sacrifice of stiffness, it is also possible to conduct copolymerization in the first stage by adding a small amount of ethylene. In the second stage random copolymerization of propylene and ethylene in the liquefied propylene or in the gas phase or polymerization of ethylene alone in the gas phase so that the ethylene content in the polymer block produced in the second stage is 10% by weight or more to produce an ethylene-propylene copolymer block or an ethylene homopolymer block accounting for 5 to 40% by weight of the final block copolymer.

Examples of practical embodiments for propylene-ethylene block copolymerization are:

(1) conducting both stages of the polymerization in the liquefied monomer in their entirety, (2) initiating the first stage of the polymerization in the liquefied monomer, continuing the polymerization in the liquefied monomer or in the gas phase and subsequently conducting the second stage polymerization in the gas phase, (3) conducting both stages of the polymerization in the gas phase in their entirety.

The present invention is applicable to any of the above modes and fully exhibits its effects in each case.

When polymerization is conducted in liquefied monomer, it is carried out at a temperature of about 0° C. to 90° C., preferably 40° C. to 80° C., and under a pressure at which monomer is present in the liquid form, preferably about 15 to 40 kg/cm$^2$G. When polymerization is conducted in the gas phase, it is carried out at a temperature below the softening point of the polymer product, preferably at 40° C. to 100° C., and under a pressure of about atmospheric pressure to 60 kg/cm$^2$.G, preferably about 5 to 50 kg/cm$^2$.G.

Although it is preferred to add known molecular weight regulating agents such as hydrogen etc. in each stage of the polymerization in a conventional manner in order to regulate the processability of the polymer, the polymerization of ethylene or the random copolymerization of ethylene and propylene may be carried out in the absence of such molecular weight regulating agent.

The polymerization may be carried out batchwise using one or more polymerization reactors or continuously by using two or more polymerization reactors. When polymerization is carried out in the liquefied monomer, commonly employed vessel reactors or loop type reactors are suitable and when polymerization is carried out in the gas phase, it may be carried out in an agitated reactor, a fluidized bed reactor or an agitating fluidized bed reactor.

The present invention is illustrated further by reference to the following examples, but it is not limited thereto. The results of the Examples are shown in Tables 1 and 2, in which the values of the physical properties and characteristics are measured according to the following methods:

Melt index: ASTM D 1238-57T
Vicat softening point: ASTM D 1525
Brittleness temperature: ASTM D 746
Flexural rigidity: ASTM D 747-58T
Izod impact strength: measured at 20° C. and −20° C. according to ASTM D 256.

The ethylene content in the total polymer was calculated from the infrared spectrum. The intrinsic viscosity $[\eta]$ was measured at 135° C. in tetralin. The cohesion of the powder was calculated from the shear stress when the vertical stress obtained by the one face shear test was extrapolated to zero. According to our finding, when the cohesion of the powder exceeds 2 g/cm², handling of the powder becomes very difficult. The gram number of the polymer produced per gram of the titanium trichloride solid catalyst (polymer g/g-titanium trichloride solid catalyst) is expressed as pp./cat.

EXAMPLE 1

(1) Synthesis of Catalyst (i) To a 200 l autoclave equipped with a stirrer were added 45.5 l of hexane and 11.8 l of titanium tetrachloride and the solution was kept between −10° C. and −5° C. A solution of 43.2 l of hexane and 9.4 l of diethylaluminum chloride was added dropwise with stirring at 130 rpm for 3 hours during which the temperature in the autoclave was kept between −10° C. and −5° C. The reaction solution was maintained between −10° C. and 0° C. for 15 minutes and the temperature was raised to 65° C. over a period of an hour. The reaction solution was stirred at 65° C. for 2 hours. The solid product was then separated from the liquid phase, and washed six times with 50 l of hexane.

(ii) The hexane was removed from the solid product and the thus obtained dried product was suspended in 92 l of hexane to which 19.6 l of di-isoamyl ether were added. The suspension was stirred at 35° C. for an hour and the solid product was separated from the liquid phase and washed six times with 50 l of hexane. To the ether-treated product were added 60 l of a solution of 40% by volume of titanium tetrachloride in hexane and the suspension was kept at 70° C. with stirring for 2 hours. The liquid phase was then removed and washed 10 times with 50 l of hexane. The solid was separated from the hexane and dried. The thus obtained titanium trichloride solid catalyst is referred to as titanium trichloride solid catalyst (I).

(2) Block Copolymerization of Propylene-Ethylene

The block copolymerization was carried out in two stages.

To a 200 l autoclave equipped with stirring means were added 1.9 g of titanium trichloride solid catalyst (I) and 20 g of diethylaluminum chloride. In the first stage, 150 l of liquefied propylene were fed and the polymerization continued at a temperature of 70° C. until the polymerization amount reached 17.0 kg. During the polymerization, hydrogen was supplied to regulate the molecular weight in a conventional manner.

At the end of the first stage, a small sample of the polymer was removed for measuring the intrinsic viscosity $[\eta]$ of the produced polymer. The time for polymerization in the first stage was 2.5 hours.

Next, in the second stage, after the autoclave temperature was set at 50° C., ethylene gas was supplied and a random co-polymerization of ethylene-propylene was carried out in the presence of hydrogen until the polymerization amount in the second stage reached 4.5 kg. During polymerization the concentration of ethylene in the gas phase in the autoclave was 8.9 to 11.3 mol % and the average ethylene concentration in the gas phase was 10.2 mol %. The polymerization time in the second stage was 1.9 hours.

At the end of the second stage, the polymer slurry obtained was introduced to a 200 l autoclave from an upper location and 100 l of the liquefied propylene were supplied from a lower location to wash the soluble catalyst and the soluble by-products in the polymer slurry and the polymer was withdrawn from the bottom. The washed polymer was dried to give the white powdery polymer. The obtained polymer was then pelletized after adding 0.1% by weight of 2,6-di-tert-butyl p-cresol and 0.1% by weight of calcium stearate.

The structure and the physical properties of the obtained polymer are shown in Tables 1 and 2, respectively.

EXAMPLE 2

The procedures in Example 1 were repeated except that 3.9 ml of methyl methacrylate were added as the third component together with the catalyst in the polymerization. The average ethylene concentration in the gas phase in the second stage was 9.8 mol % and the polymerization times of the first and second stages were 3.1 and 2.3 hours, respectively.

The structure and the physical properties of the obtained polymer are shown in Tables 1 and 2, respectively.

COMPARATIVE EXAMPLE 1

The procedures of Example 1 were repeated except that instead of titanium trichloride solid catalyst (I) 6.7 g of TiCl₃AA (manufactured by Toho Titanium Co., grade: TAC 132) were used. The average ethylene concentration in the gas phase in the second stage was 10.0 mol %. The polymerization times of the first and second stages were 2.1 and 1.6 hours, respectively.

Although the polymer obtained was treated in the same manner as in Example 1, a large amount of the catalyst residue was contained in the polymer and the polymer showed yellow discoloration on pelletization, and therefore it was further treated with alcohol-heptane to decompose and extract the catalyst residue, dried and pelletized after adding 0.1% by weight of 2,6-di-tert-butyl p-cresol and 0.1% by weight of calcium stearate.

The transfer of the polymer slurry to a cyclone was difficult due to the blocking of the piping when the polymer was withdrawn from the autoclave and the polymerization temperature was extremely unstable due to the difficulty of heat removal and the deposit of the polymer on the inner wall of the autoclave during the polymerization.

The structure and the physical properties of the obtained polymer are shown in Tables 1 and 2, respectively.

EXAMPLE 3

(1) Synthesis of Catalyst (i) The atmosphere in a 1 l autoclave was displaced with argon, 200 ml of hexane and 50 ml of titanium tetrachloride were charged, and the resulting solution was kept at $-5°$ C. A solution of 150 ml of dry hexane and 58 cc of diethylaluminum chloride was added dropwise so that the temperature of reaction system was kept at $-3°$ C. After the addition, the stirring was continued for 30 minutes, the temperature was raised to 70° C. and the stirring was continued for an additional one hour. After being allowed to stand, the reduction product was separated from the liquid and washed with 200 ml of hexane.

(ii) 70 g of the obtained reduction product and n-decane were mixed to give a slurry having slurry-concentration of 0.2 g/ml and the slurry was heat-treated at 140° C. for 2 hours. After the treatment, the supernatant liquid was withdrawn and the treated solid was washed with 200 ml of hexane twice to obtain a titanium trichloride composition. The resulting titanium trichloride composition is referred to as titanium trichloride composition (A).

(iii) Titanium trichloride composition (A) of 11.0 g was suspended in 55 ml of toluene and iodine and di-isoamyl ether were added in amounts to give a molar ratio of titanium trichloride composition (A)/I$_2$/di-isoamyl ether of 1.0/0.1/1.0 and then reacted at 80° C. for one hour to obtain titanium trichloride solid catalyst. This catalyst is referred to as titanium trichloride solid catalyst (II).

Block Copolymerization of Propylene-Ethylene

A 200 l autoclave equipped with stirring means was evacuated. Next propylene was charged under pressure to 300 mmHg and then the propylene pressure was reduced to $-500$ mmHg.G. ("G" is Gauge pressure). Both operations were repeated three times.

Then, 2.6 g of titanium trichloride solid catalyst (II) and 51 g of diethylaluminum chloride were added.

In the first stage, 51 kg of the liquefied propylene were added and the polymerization proceeded at a temperature of 70° C. in the liquefied propylene in the presence of hydrogen. When the polymerization amount reached 31.7 kg, a small sample of the polymer was withdrawn to determine the intrinsic viscosity [$\eta$] of the produced polymer, and the unreacted monomer in the autoclave was purged to 2 kg/cm$^2$G.

In the second stage, ethylene gas and propylene gas were supplied and the pressure was raised to 10 kg/cm$^2$.G, after which the polymerization proceeded at a temperature of 70° C. in the presence of hydrogen in the gas phase. During the polymerization, in order to remove the polymerization heat, the mixed gas of the monomers in the autoclave was withdrawn at a flow rate of 17.8 m$^3$ per hour, cooled to 50° C. in a heat exchanger and again blown into the lower part of the autoclave via a circulating compressor. When the polymerization amount reached 6.5 kg, the circulation of the mixed gas of the monomers was stopped and the unreacted monomers in the autoclave were discharged. The ethylene concentration in the autoclave in the second stage was between 9.8 and 12.7 mol % and the average ethylene concentration was 11.2 mol %.

The polymer obtained was transferred to a 200 l autoclave equipped with stirring means, 190 g of propylene oxide were added and the mixture was stirred at 60° C. for 30 minutes to deactivate the catalyst residue contained in the polymer, after which the polymer was dried to give the white powdery polymer. The polymer was pelletized after adding 0.1% by weight of 2,6-di-tert-butyl p-cresol and 0.1% by weight of calcium stearate and the pellets showed no discoloration without any special problems. The structure and the physical properties of the polymer thus obtained are shown in Table 1 and 2, respectively.

Throughout this experiment, there was no problem such as the blocking of the piping, etc. and when the inside of the autoclave was inspected after the polymerization neither deposit of the polymer on the wall nor agglomeration of the polymer was found.

COMPARATIVE EXAMPLE 2

The procedures of Example 3 were repeated except that the polymerization amount in the first stage was 14.0 kg and the polymerization amount in the second stage was 2.9 kg. The ethylene concentration in the second stage was 10.0 to 12.7 mol % and the average ethylene concentration was 11.3 mol %. The polymer obtained was treated with propylene oxide and pelletized as in Example 3. Although there was no blocking of the piping during the experiment, the obtained pellets were yellow-colored.

EXAMPLE 4

The atmosphere in a 5 l autoclave equipped with stirring means was fully displaced with nitrogen and 200 g of sodium chloride granules were charged as a catalyst dispersing agent. Then, 0.105 g of titanium trichloride solid catalyst (II) and 1.6 g of diethylaluminum chloride were added and hydrogen corresponding to a partial pressure of 0.20 kg/cm$^2$ were introduced. The inner temperature of the autoclave was raised to 70° C., propylene was charged under pressure to 30 kg/cm$^2$.G and the polymerization was continued in the gas phase by supplying propylene to maintain this pressure. After 3 hours, the introduction of propylene was stopped and the unreacted propylene gas was purged until the inner pressure of the autoclave became 6 kg/cm$^2$.G. Calculation of the material balance from the amount of propylene gas supplied to the autoclave revealed that 760 g of propylene homopolymer had been produced thus far.

The temperature was again raised to 60° C. and ethylene gas was charged under pressure until the inner pressure of the autoclave reached 10 kg/cm$^2$. The random copolymerization of ethylene-propylene was continued in the gas phase supplying ethylene and propylene to maintain this pressure, during which the concentration of ethylene in the autoclave was adjusted to constant 35 mol %. An hour later, the introduction of propylene and ethylene was stopped, the unreacted monomers were purged and the catalyst was inactivated by adding 20 ml of propylene oxide saturated with water. Next, 800 ml. of water was added to the polymer for removing the sodium chloride granules used for dispersing the solid catalyst, and the polymer was filtered and dried at 60° C. to obtain a white powdery polymer. The polymerization activity of titanium trichloride solid catalyst (II) was 8038 g as expressed as the polymer yield per gram of TiCl$_3$ (polymer g/TiCl$_3$(g); abbreviated as pp/cat. in Table 1). The ethylene content in the total polymer was 21% by weight. The cohesion of the powder of the produced polymer was 1.58 g/cm$^2$. After adding 0.1% by weight of 2,6-di-tert-butyl p-cresol and 0.1% by weight of calcium stearate, the white powdery polymer was press-molded. The obtained sheet had no problem such as discoloration and the like.

COMPARATIVE EXAMPLE 3

Example 3 was repeated except that instead of titanium trichloride solid catalyst (II), 0.351 g of TiCl$_3$AA (manufactured by Toho Titanium Co., grade: TAC) was employed to obtain 806 g of propylene-ethylene copolymer. The polymerization activity of titanium trichloride was 2296 pp/cat. The ethylene content in the total polymer was 19% by weight. The cohesion of the powder of the produced polymer was 3.35 g/cm$^2$.

It is apparent that the use of the catalyst systems used in the present invention gives less powder cohesion and highly enhanced polymerization activity.

EXAMPLE 5

Preparation of Catalyst 1 (preparation of β-type titanium trichloride)

The air of a 1 l reactor was displaced with argon, 200 ml of dry hexane and 50 ml of titanium tetrachloride were added and the solution was kept at −5° C. Then, a solution of 150 ml of dry hexane and 58 cc of diethylalminum chloride was added dropwise so that the temperature of the reaction system was kept at −3° C. or less. After the addition, the stirring was continued for 30 minutes, the temperature was raised to 70° C. and the stirring was continued for an additional hour. After being allowed to stand, the β-type titanium trichloride was separated from the liquid and washed with 200 ml of hexane three times to give the β-type titanium trichloride.

Preparation of Catalyst 2 (preparation of Lewis base treated solid)

31.2 g of the β-type titanium trichloride prepared as in Preparation of Catalyst 1 was suspended in 106.0 ml of dry hexane and di-isoamyl ether was added in an amount of 1.2 mols per mole of the β-type titanium trichloride, after which the mixture was stirred at 40° C. for an hour. The supernatant liquid was withdrawn after the reaction. And the treated solid was washed three times with 100 ml of hexane and dried.

Preparation of Catalyst 3

12.5 g of the treated solid obtained in Preparation of Catalyst 2 was added to a solution of 37.5 g of n-decane and 25.0 ml of ethylaluminum dichloride and treated at 120° C. for two hours. The supernatant liquid was withdrawn after the reaction. And the titanium trichloride composition was washed three times with 40 ml of hexane and dried. The titanium trichloride composition thus obtained contained 4.18% by weight of Al and its X-ray diffraction showed an inherent peak of the δ-type titanium trichloride.

Preparation of Catalyst 4

9.2 g of the titanium trichloride composition obtained in Preparation of Catalyst 3 were suspended in 46.0 ml of hexane and carbon tetrachloride and di-isoamyl ether were added in amounts to give a molar ratio of the titanium trichloride composition/CCl$_4$/di-isoamyl ether of 1/0.3/0.5 and then treated at 60° C. for 2 hours. The supernatant liquid was then withdrawn and the remaining solid was washed three times with 40 ml of hexane to obtain the titanium trichloride solid catalyst. The titanium trichloride solid catalyst thus obtained is referred to as titanium trichloride solid catalyst (III).

Block Copolymerization of Propylene-Ethylene

A 200 l autoclave equipped with stirring means was evacuated. Next, propylene was charged under pressure to 300 mmHg.G and the propylene pressure was reduced to −500 mmHg.G. Both operations were repeated three times. Then, 2.6 g titanium trichloride solid catalyst (III) and 51 g of diethylaluminum chloride were added.

In the first stage, 42.5 kg of the liquefied propylene were added under pressure and the polymerization proceeded at a temperature of 70° C. in the liquefied propylene in the presence of hydrogen. When the polymerization amount reached 25.2 kg, a small sample of the polymer was withdrawn to determine the intrinsic viscosity [η] of the produced polymer, and the unreacted monomer in the autoclave was purged to 2 kg/cm$^2$.G.

In the second stage, ethylene gas and propylene gas were supplied and the pressure was raised to 10 kg/cm$^2$.G, after which the polymerization proceeded at a polymerization temperature of 70° C. in the presence of hydrogen in the gas phase. When the polymerization amount reached 6.3 kg, the supply of the mixed gas of the monomers was stopped and the unreacted monomers in the polymerization vessel were purged. The ethylene concentration in the polymerization vessel in the second stage was 25.3 to 27.8 mol % and the average ethylene concentration in the gas phase was 26.9 mol %. The polymer product was transferred to a 200 l autoclave equipped with stirring means, 180 g of propylene oxide were added and the mixture was stirred at 60° C. for 30 minutes to initiate the catalyst residue contained in the polymer, after which the polymer was dried to give the white powder polymer. The product was then pelletized after adding 0.1% by weight of 2,6-di-tert-butyl p-cresol and 0.1% by weight of calcium stearate and the pellets showed no discoloration without any special problems.

Throughout the entire experiment, there was no problem such as the blocking of the piping etc., and when the inside of the autoclave was inspected after the polymerization neither the deposit of the polymer on the wall nor agglomeration of the polymer was found. The structure and the physical properties of the polymer thus obtained are shown in Tables 1 and 2, respectively.

COMPARATIVE EXAMPLE 4

The procedures of Example 5 were repeated except that instead of the titanium trichloride solid catalyst (III), 8.5 g of TiCl$_3$AA (manufactured by Toho Titanium Co., grade: TAC 131) was employed. The ethylene concentration in the second stage was 25.4–27.6 mol % and the average ethylene concentration in the gas phase was 26.6 mol %. The polymer was treated with propylene oxide as in Example 5 but a large amount of the catalyst residue still remained and the pellets were yellow-colored on pelletizing. Therefore, the polymer was treated with an alcohol-heptane to decompose the catalyst and extract the catalyst residue and dried to obtain the white powder polymer. The polymer was then pelletized after adding 0.1% by weight of 2,6-di-tert-butyl p-cresol and 0.1% by weight of calcium stearate.

In addition to the difficulty of the temperature control during the polymerization, a difficulty was also encountered during the transfer of the polymer after withdrawal from the autoclave due to the blocking of the piping. After the experiment, inspection of the inside of the polymerization vessel revealed the deposit of a large amount of the polymer on the inner wall and on the stirring means. The structure and the physical properties of the obtained polymer are shown in Tables 1 and 2, respectively. From the comparison of the Examples with Comparative Examples in the physical properties of propylene-ethylene block copolymer, it is apparent that the copolymers in the present invention are superior to those in Comparative Examples in heat resistance and flexural rigidity.

TABLE 1

| | Ethylene content (wt. %) | Intrinsic viscosity [η] first stage (dl/g) | Intrinsic viscosity [η] second stage (dl/g) | PP/cat. (g/g) |
|---|---|---|---|---|
| Example 1 | 4.2 | 1.77 | 3.18 | 11,300 |
| Example 2 | 4.1 | 1.80 | 3.17 | 11,200 |
| Comparative Example 1 | 3.8 | 1.76 | 3.03 | 3,200 |
| Example 3 | 4.1 | 1.60 | 1.80 | 12,200 |
| Comparative Example 2 | 4.2 | 1.62 | 1.81 | 6,500 |
| Example 5 | 9.6 | 1.76 | 2.99 | 12,100 |
| Comparative Example 4 | 9.5 | 1.76 | 2.96 | 3,700 |

TABLE 2

| | Melt Index (g/10 min.) | Vicat softening point (°C.) | Brittleness Temperature (°C.) | Flexural rigidity (kg/cm²) | Izod impact strength 20° C. (kg · cm/cm²) | Izod impact strength 20° C. (kg · cm/cm²) | Powder cohesion (g/cm²) | Pellet color* |
|---|---|---|---|---|---|---|---|---|
| Example 1 | 2.8 | 76 | −22 | 10,300 | 17 | 5.3 | 1.05 | White |
| Example 2 | 2.4 | 79 | −23 | 10,900 | 15 | 5.1 | 0.95 | White |
| Comparative Example 1 | 2.8 | 73 | −21 | 9,100 | 18 | 5.9 | 3.76 | Yellow |
| Example 3 | 7.5 | 77 | −12 | 10,800 | 8.2 | 2.4 | 1.71 | White |
| Comparative Example 2 | 7.3 | 75 | −13 | 10,600 | 8.4 | 2.5 | 1.80 | Pale yellow |
| Example 5 | 2.5 | 69 | −37 | 9,500 | 16 | 5.3 | 1.79 | White |
| Comparative Example 4 | 2.4 | 65 | −37 | 8,400 | 17 | 5.5 | 4.21 | Yellow |

Note:
*Visually judged

While the invention has been described in detail and with reference to specific embodiments thereof, it will be apparent to one skilled in the art that various changes and modifications can be made therein without departing from the spirit and scope thereof.

What is claimed is:

1. In a process for producing propylene-ethylene block copolymer which comprises, in a first stage initiating polymerization of propylene alone or with a minor amount of ethylene in the substantial absence of an inert solvent and continuing the polymerization in liquified monomer or in the gas phase so that the ethylene content in the polymer produced in the first stage is not more than about 4% by weight to produce crystalline polypropylene accounting for about 60 to 95% by weight of the final block copolymer and, subsequently, in the second stage, randomly copolymerizing propylene and ethylene in liquified monomer or in the gas phase or polymerizing ethylene alone in the gas phase so that the ethylene content in the polymer block produced in the second stage is 10% by weight or more to produce an ethylene-propylene copolymer block or an ethylene homopolymer block accounting for 5 to 40% by weight of the final block copolymer, in the presence of a catalyst system, wherein said polymerization is carried out at a temperature of 0° to 90° C. under a pressure at which the monomer is present in the liquid form or is carried out in a gas phase at a temperature below the softening point of the polymer product under a pressure of about atmospheric pressure to 60 kg/cm², the improvement which comprises said catalyst system comprising:

a titanium trichloride solid catalyst component obtained by (a) reacting
   (i) a reduced product obtained by reducing titanium tetrachloride with an organoaluminum compound of the formula $R'_n AlX'_{3-n}$, wherein R' represents a straight chain or branched chain alkyl group, an alicyclic group or an aryl group each having up to 18 carbon atoms, X' represents a halogen atom or a hydrogen atoms and n is a number $1 \leq n \leq 3$,
   (ii) a heat treated solid obtained by heat treating the reduced product (i) in the presence or absence of an inert hydrocarbon solvent at a temperature of about 50° to 120° C., or
   (iii) a reaction product obtained by further reacting the reduced product (i) with an aluminum compound of the formula $R''_p AlX_{3-p}$, wherein R'' represents a straight chain or branched chain alkyl group, an alicyclic group or an aryl group each having up to 18 carbon atoms, X represents a halogen atom and p is a number $1 \leq p \leq 1.5$;
with a mixture of halogen or a halogen compound and an ether;

(b) reacting
   (i) a reduced product obtained by reducing titanium tetrachloride with an organoaluminum compound of the formula $R'_n AlX'_{3-n}$, wherein R' represents a straight chain or branched chain alkyl group, an alicyclic group or an aryl group each having up to 18 carbon atoms, X' represents a halogen atom or a hydrogen atom and n is a number $1 \leq n \leq 3$, or
   (ii) a heat treated solid obtained by heat treating the reduced product (i) in the presence or absence of an inert solvent at a temperature of 20° to 100° C.,
with an ether and then reacting the ether-treated solid with titanium tetrachloride, or further reacting the resulting product with a mixture of halogen or halogen compound and an ether; or (c) reducing titanium tetrachloride with an organoaluminum compound of the formula $R'_nAlX'_{3-n}$, wherein R' represents a straight chain or branched chain alkyl group, an alicyclic group or an aryl group each having 1 to 18 carbon atoms, X' represents a halogen atom or a hydrogen atom and n is a number $1 \leq n \leq 3$, reacting the reduced product with an ether compound, and then reacting the ether treated compound with an aluminum compound of the formula $R''pALX_{3-p}$, wherein R" represents a straight chain or branched chain alkyl group, an alicyclic group, or an aryl group, each having 1 to 18 carbon atoms, X represents a halogen atom and p is a number $1 \leq p \leq 1.5$ and further reacting said product with an ether or a mixture of a halogen or a halogen compound and an ether,

[B] an organoaluminum compound of the formula $R_mAlY_{3-m}$, wherein R represents a straight chain or branched chain alkyl group having 1 to 8 carbon atoms, Y represents a halogen atom or a hydrgen atom or an alkoxy group and m is a number $2 \leq m \leq 3$, and, optionally,

[C] an electron donor as a third component, selected from the group consisting of amines, ethers, esters, derivatives of sulfur, halogens, benzene, azulene, organic or inorganic nitrogen and phosphorus compounds, said component [B] being used in concentration of about 0.05 to 50 m mol per mol of the monomer, the molar ratio of [B] to [A] being about 1/1 to 500/1, the molar ratio of [C] to [A] being about 0.1 to 10 when [C] is used, and said catalyst [A] being used to produce at least 8,000 g block copolymer per gram of solid catalyst.

2. The process of claim 1, wherein said first stage and said second stage of the polymerization are carried out in liquefied monomer at 40° to 80° C. under a pressure of about 15 to 40 kg/cm²G.

3. The process of claim 1, wherein said polymerization is initiated in liquefied monomer and continued in liquefied monomer at 40° to 80° C. under a pressure of about 15 to 40 kg/cm²G or in the gas phase at 40° to 100° C. under a pressure of about 5 to 50 kg/cm²G and, subsequently, the second stage is conducted in the gas phase.

4. The process of claim 1, wherein said first and second stages are conducted in the gas phase at 40° to 100° C. under a pressure of about 5 to 50 kg/cm²G.

5. The process of claim 1 wherein said electron donor is present.

6. The process of claim 1 wherein said catalyst component [A] is component (a) (i).

7. The process of claim 1 wherein said catalyst component [A] is component (a) (ii).

8. The process of claim 1 wherein said catalyst component [A] is component (a) (iii).

9. The process of claim 1 wherein said catalyst component [A] is component (b) (i).

10. The process of claim 1 wherein said catalyst component [A] is component (b) (ii).

11. The process of claim 1 wherein said catalyst component [A] is component (c).